United States Patent [19]
Liao

[11] Patent Number: 6,149,457
[45] Date of Patent: Nov. 21, 2000

[54] POSITIONING STRUCTURE OF A TELEPHONE CABLE-WINDING DEVICE

[76] Inventor: Sheng Hsin Liao, No. 137, San Chun St., Shu Lin Jen, Taipei Hsien, Taiwan

[21] Appl. No.: 09/247,932

[22] Filed: Feb. 11, 1999

[51] Int. Cl.$^7$ .................................................. H01R 13/72
[52] U.S. Cl. .................... 439/501; 191/12.2 R; 191/12.4
[58] Field of Search .................. 439/501, 4; 191/12.2 R, 191/12.4

[56] References Cited

U.S. PATENT DOCUMENTS

| | | | |
|---|---|---|---|
| 4,940,859 | 7/1990 | Peterson | 439/501 |
| 5,241,593 | 8/1993 | Wagner | 191/12.4 |
| 5,733,141 | 3/1998 | Penrod | 439/501 |
| 5,773,757 | 6/1998 | Kenney et al. | 439/501 |
| 5,796,047 | 8/1998 | Sheng-Hsin | 174/135 |

*Primary Examiner*—Gary F. Paumen
*Attorney, Agent, or Firm*—Rosenberg, Klein & Lee

[57] ABSTRACT

A positioning structure of a telephone cable-winding device is disclosed. A specified positioning body is installed on the cable of a cable-winding device with a distance to a primary plug or a secondary plug on the distal end thereof. When the receiver is hung on the mainframe, if the cable is received to a proper length, a buffer length is left between the mainframe and the receiver. Thus, the quality of communication will not be effect due to the receiver being separated with the mainframe by the cable-winding device. Moreover, the whole telephone has a beautiful outlook.

6 Claims, 7 Drawing Sheets

PIROR ART

POSITIONING STRUCTURE OF A TELEPHONE CABLE-WINDING DEVICE

BACKGROUND OF THE INVENTION

1. Field of the Invention

The present invention relates to a positioning structure of a telephone cable-winding device, and especially to a positioning structure, by which, the rapid rewinding cable can be positioned rapidly and will not pull the receiver from a normal position.

2. Background of the Invention

In generally, a telescopic cable with a helical shape is formed between a telephone mainframe and a receiver so that when the user has taken a receiver, the receiver will separate with the mainframe. However, the receiver has been put into the mainframe, the cable will fatigue in elasticity with the using time and distance. Therefore, the cable is intricate and prolonged. This not only effects the outlook thereof, but also since the cable is intricate, thus, user need waste much time to order the cable. Thus, a telephone cable-winding device is eagerly desired, for example, U.S. Pat. No. 5,796,047 or another example shown in FIG. 7.

The telephone cable-winding device 4 shown in FIG. 7 is designed with a general measuring tape theory. By the restoring spring within the cable-winding device 4 to apply a force to the cable 40, the cable 40 can be retained in a restorable state. That is, the cable 40 is pulled by a tension at any time. A primary plug may be adhered to the seat of the cable-winding device 4, or as shown in the figure, the primary plug 41 is led out from the cable 40 for being inserted to the receptacle 50 of a telephone mainframe 5. The secondary plug 42 is fixedly connected to the distal end of another cable 40 so as to insert into the receptacle of the receiver 50. The two cable 40 are intricate within the cable-winding device 4. Therefore, within a predetermined distance, the user may pull away the receiver 50 for speaking. While when the receiver is put back to the telephone mainframe, the cable-winding device 4 will receive the cable 40 automatically. However, since the restoring force is large, the receiver 50 is probably shifted aside by the pulling force of the cable 40. Thus, it has an eager demand to design a novel positioning structure of a telephone cable-winding device, which can reduce the restoring force of cable.

SUMMARY OF THE INVENTION

Accordingly, the object of the present invention is to provide a positioning structure of a telephone cable-winding device. A specified positioning body is installed on the cable of a cable-winding device with a distance to a primary plug or a secondary plug on the distal end thereof. When the receiver is hung on the mainframe, if the cable is received to a proper length, a buffer length is left between the mainframe and the receiver. Thus, the quality of communication will not be effect due to the receiver being separated with the mainframe by the cable-winding device. Moreover, the whole telephone has a beautiful outlook.

The present invention will be better understood and its numerous objects and advantages will become apparent to those skilled in the art by referencing to the following drawings in which:

DETAILED DESCRIPTION OF THE PREFERRED EMBODIMENT

Figure 3:
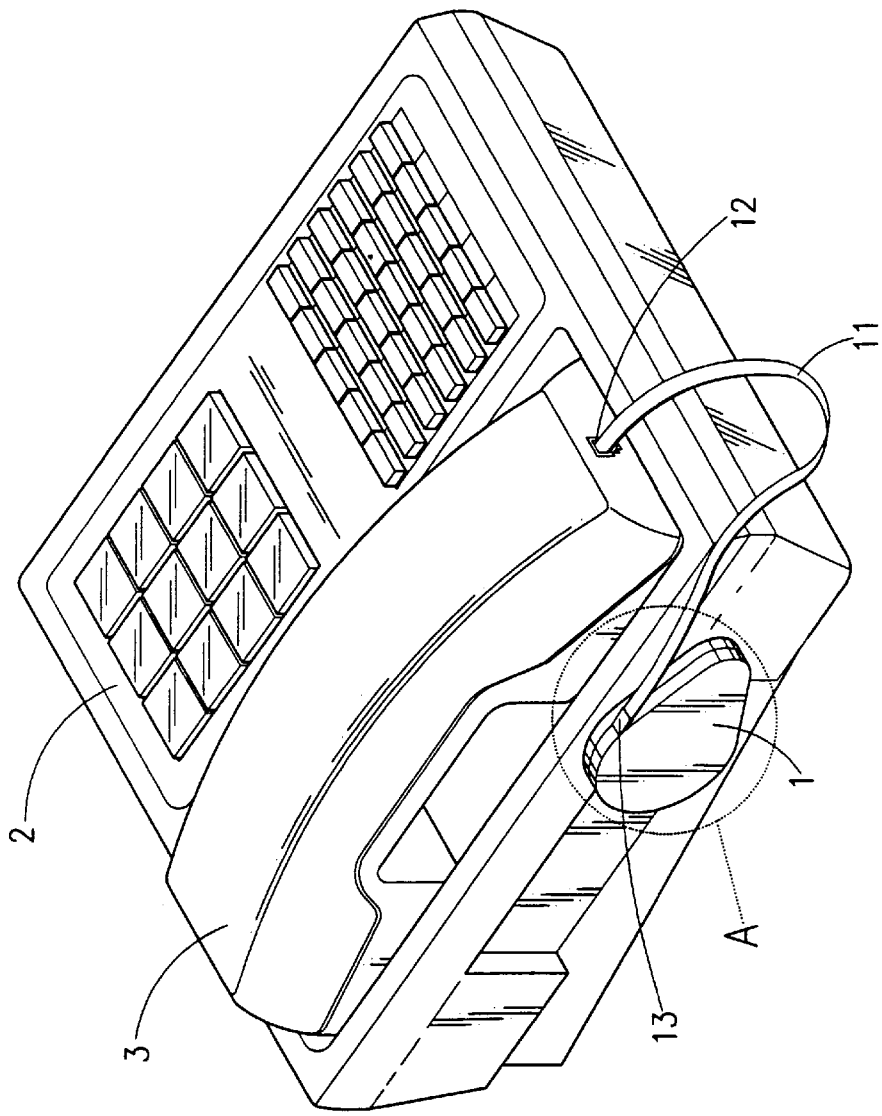
FIG. 3 is a perspective view showing the using state of the second embodiment of the present invention.
Figure 3B:
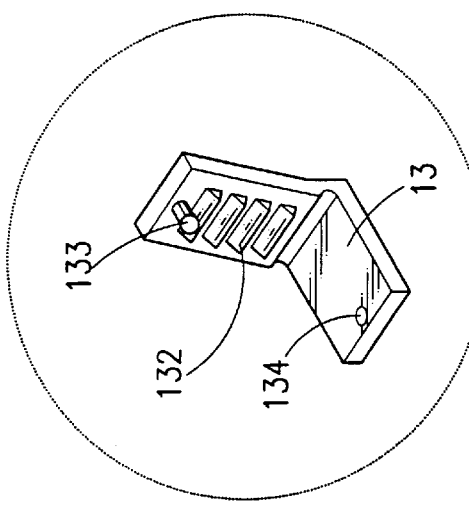
Figure 3A:
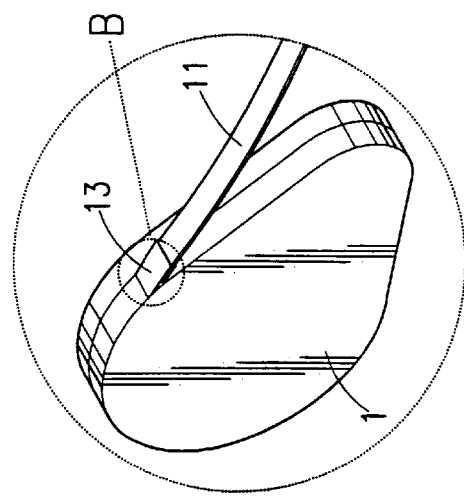
Figure 4:
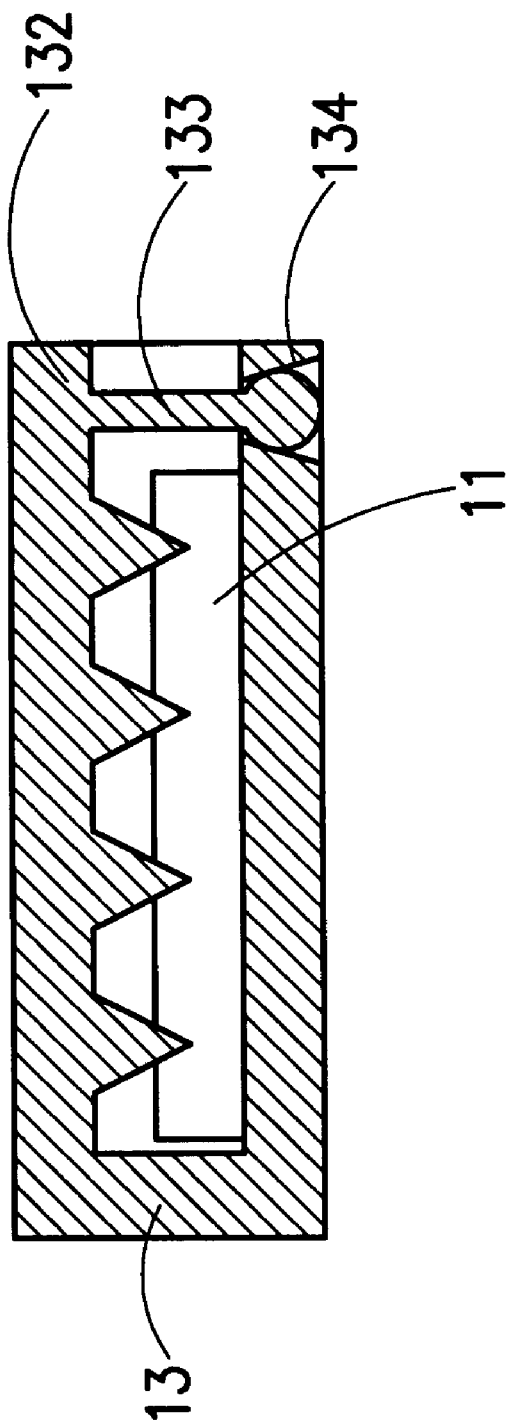
FIG. 4 is a schematic cross sectional view of the second embodiment according to the present invention.
Figure 5:
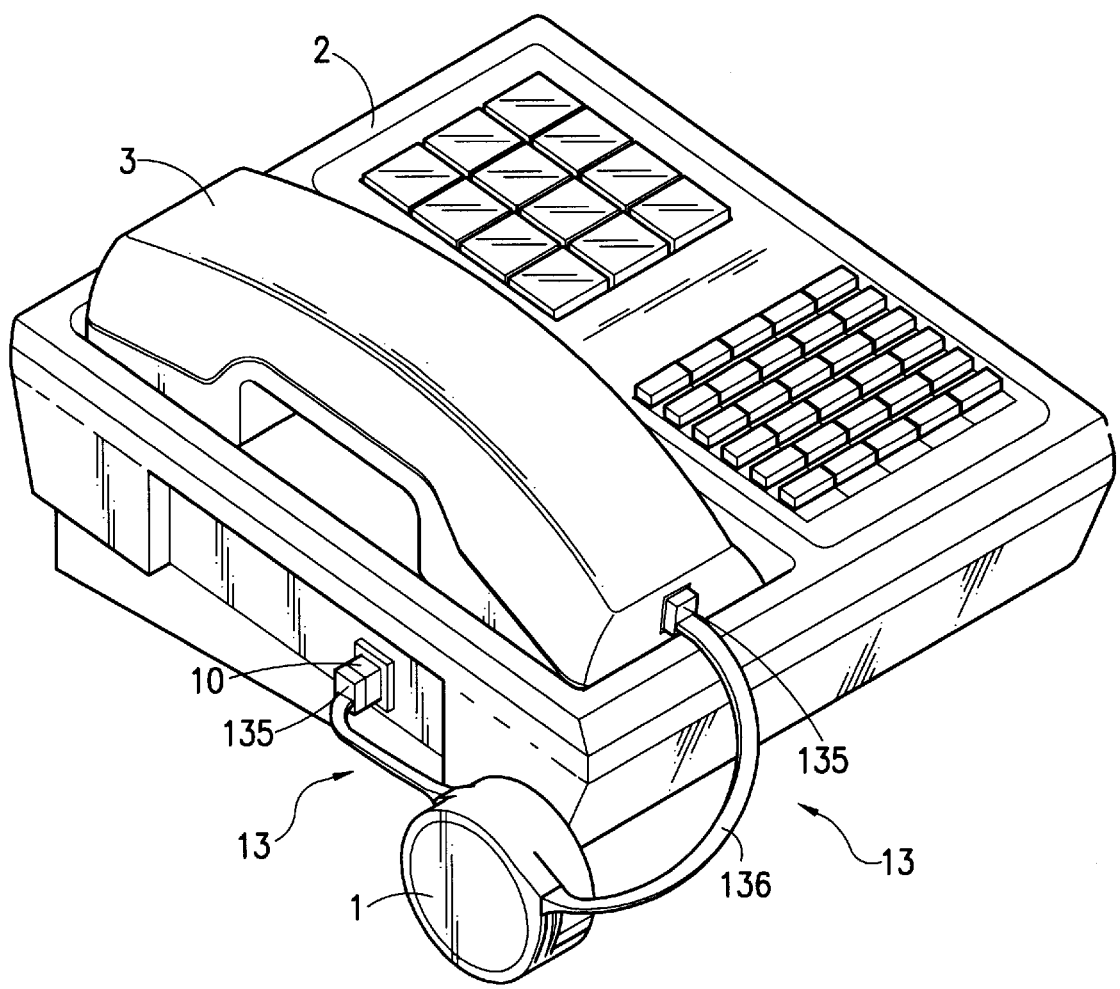
FIG. 5 is a perspective view showing the using state of the third embodiment of the present invention.

The relative views about the embodiment of the positioning structure of a telephone cable-winding device is illustrated. In the positioning structure of the telephone cable-winding device of the present invention, a positioning body 13 is formed on the cable 11 of the telephone cable-winding device 1 having a primary plug 10 and with a predetermined distance to the secondary plug 12 or the primary plug 10. Thereby, when the cable 11 is rewound, the cable-winding device 1 may stop the winding action since the positioning body 13 is inserted in the receiving hole of the cable-winding device 1 at a proper time. That is, a section of cable 11 between the positioning body 13 to the primary plug 10 or secondary plug 12 is protruded outwards as a basic connecting line as the telephone receiver runs across on the telephone mainframe 2. The clamping piece includes a clamping portion 130 clamping the cable 11 and a convex stopper 131. The shape of the piece body may be formed as a U shape metal clamping block as that shown in FIGS. 3 and 4. A plurality of buckling tips 132 and a buckling pillar 133 are formed in the inner side of the clamping block. Another inner side is formed with a buckling hole 134. Thereby, as the clamping block is in clamping state, the buckling tips 132 will insert into the cable 11 and the buckling pillar 133 inserts in the buckling hole 134. Thus, the clamping block is fixed to cable 11. The shape of the piece body 13 may be formed as that shown in FIG. 5. The telephone cable-winding device 1 in that embodiment is formed as a dual cables 11. The piece body 13 thereof is a plastic sleeve including a covering portion 135 for covering the secondary plug 12 and the primary plug 10 and a tube 136 for enclosing the cable 11.

Therefore, as shown in FIGS. 2, 3, 4 and 5, even if the receiver 3 is put on the predetermined slot on the mainframe so that the cable 11 is received by the cable-winding device 1, the cable 11 will be stopped on the receiving opening by the piece body 13 so that a cable 11 has a predetermined length is left between the primary plug 10 or the secondary plug 12 and the cable-winding device. Thus, the receiver 3 will not be pulled outwards by the cable 11 as in the prior art. Moreover, the cable has a beautiful outlook.

Figure 1:
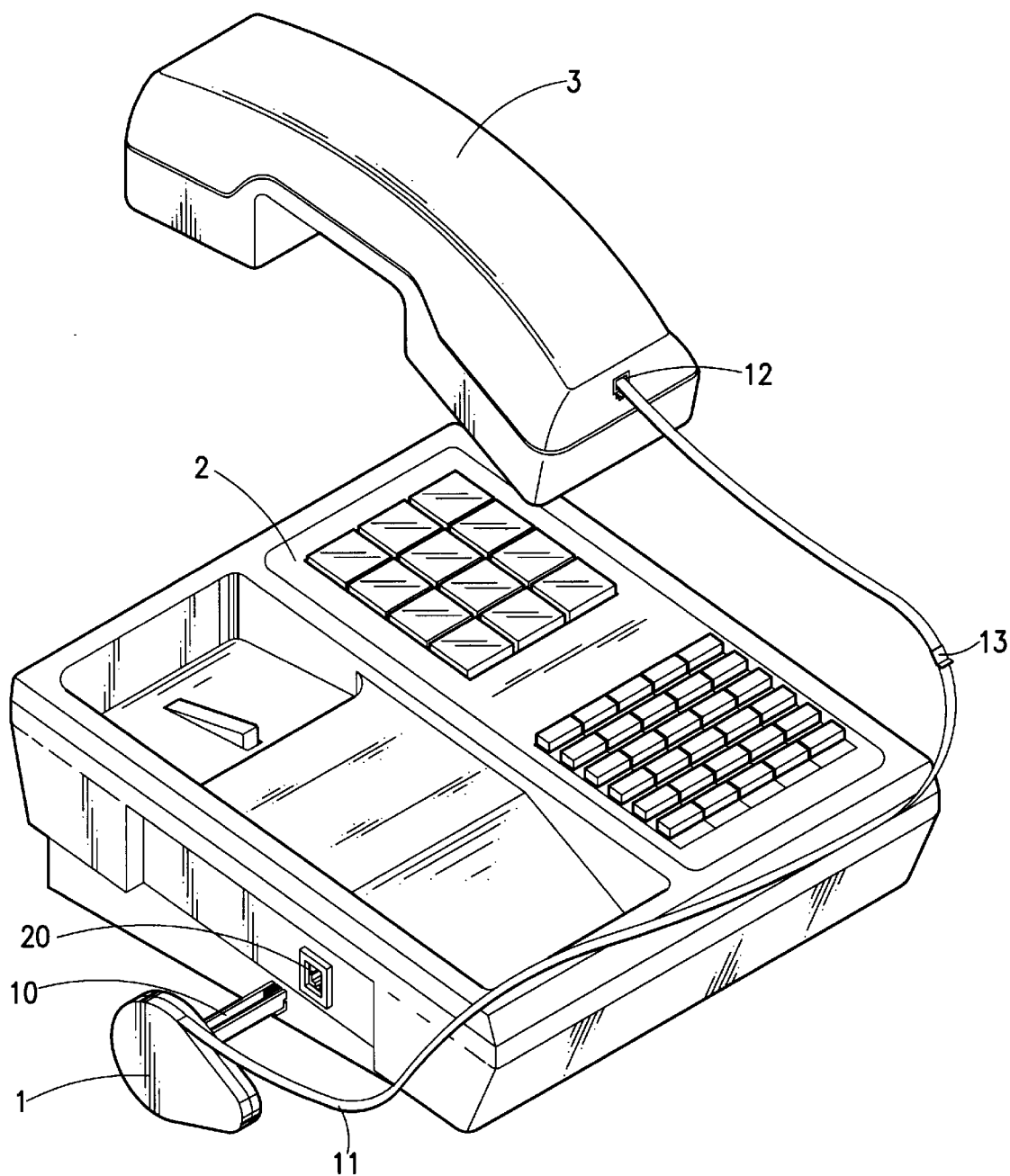
FIG. 1 shows the appearance of the first embodiment of the present invention.
Figure 2:
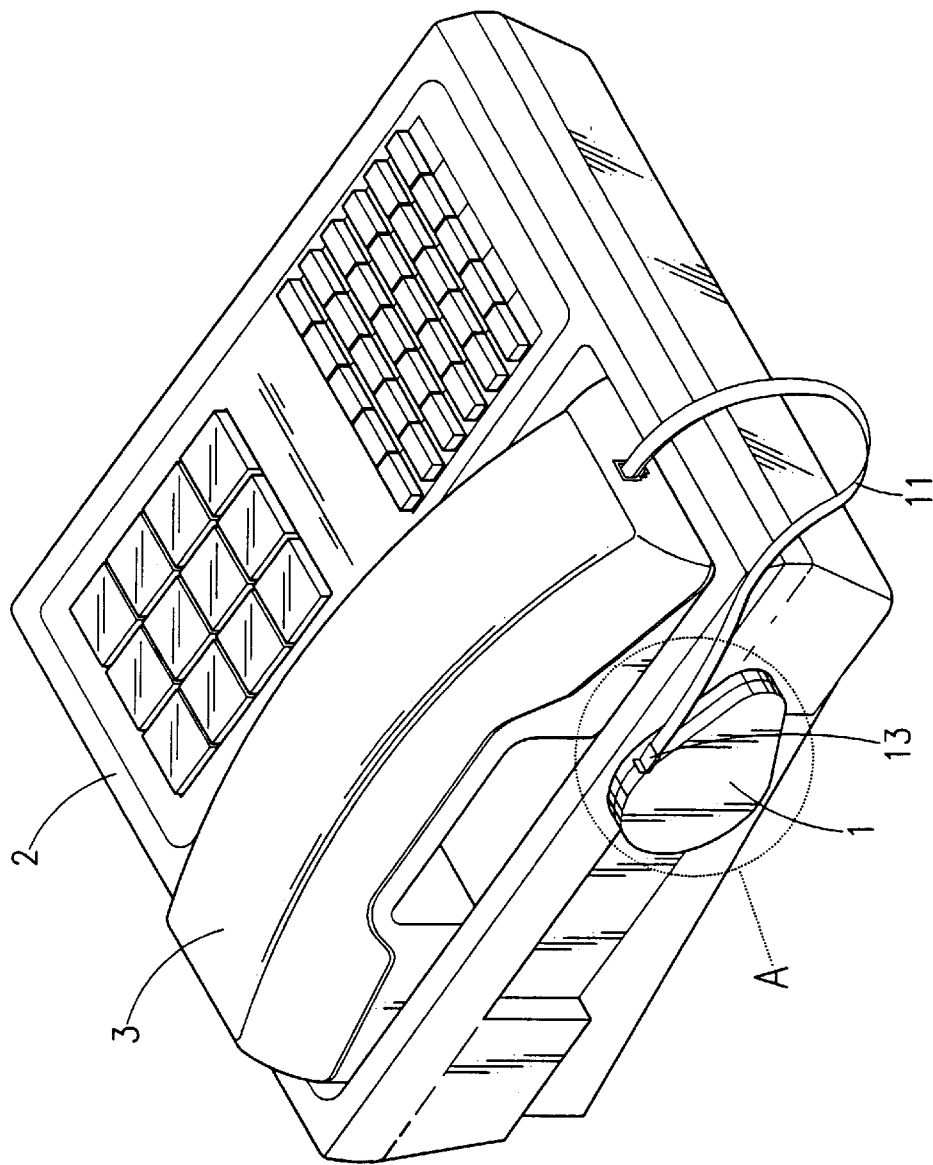
FIG. 2 is a perspective view showing the using state of the first embodiment of the present invention.
Figure 2A:
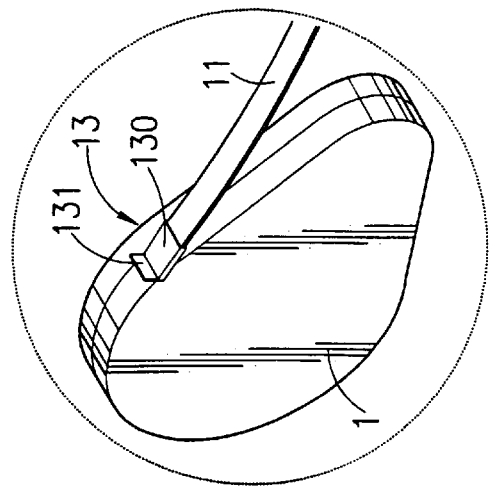
Figure 6:
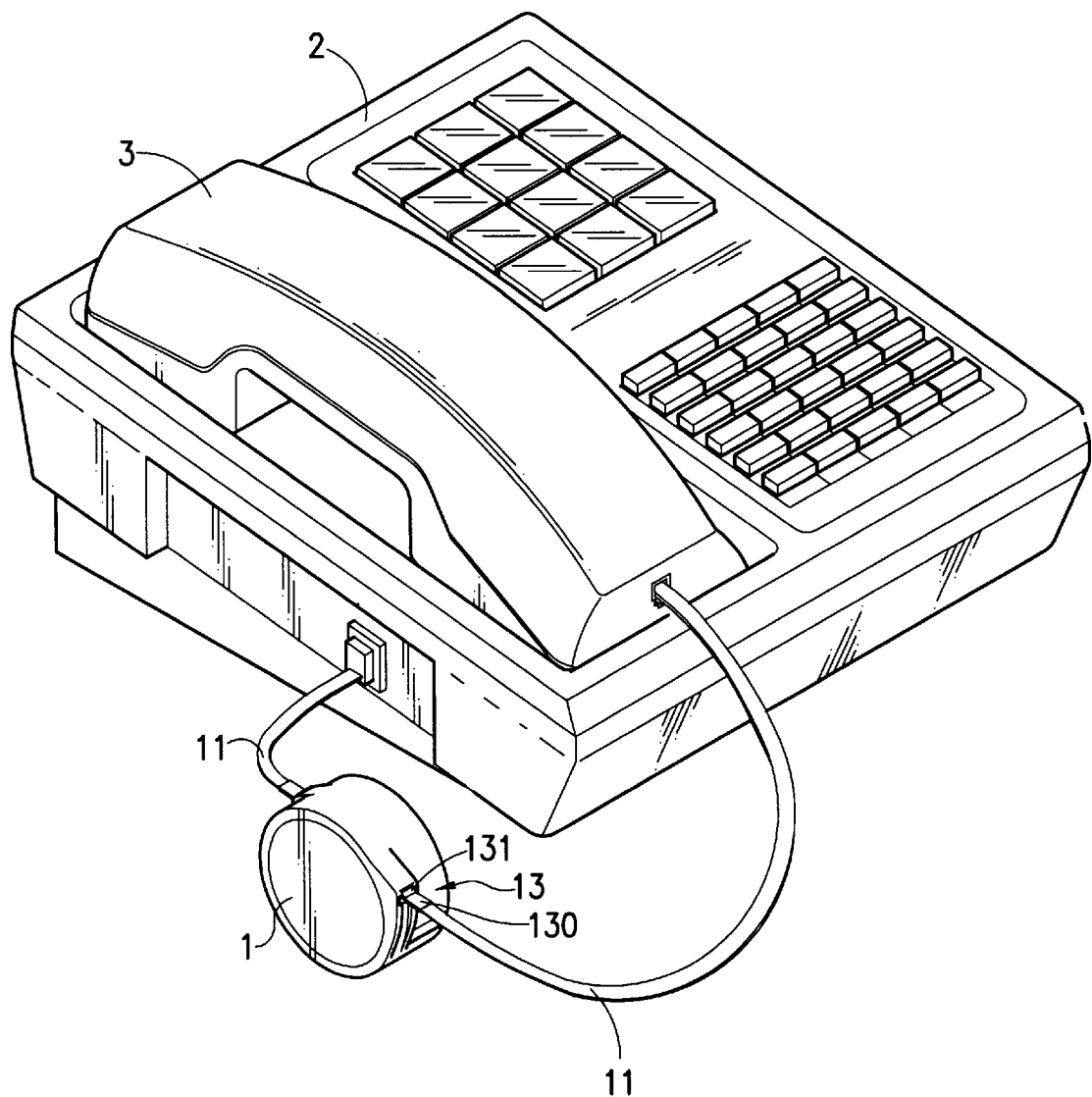
FIG. 6 is a perspective view showing the another using state of the first embodiment of the present invention.
Figure 7:
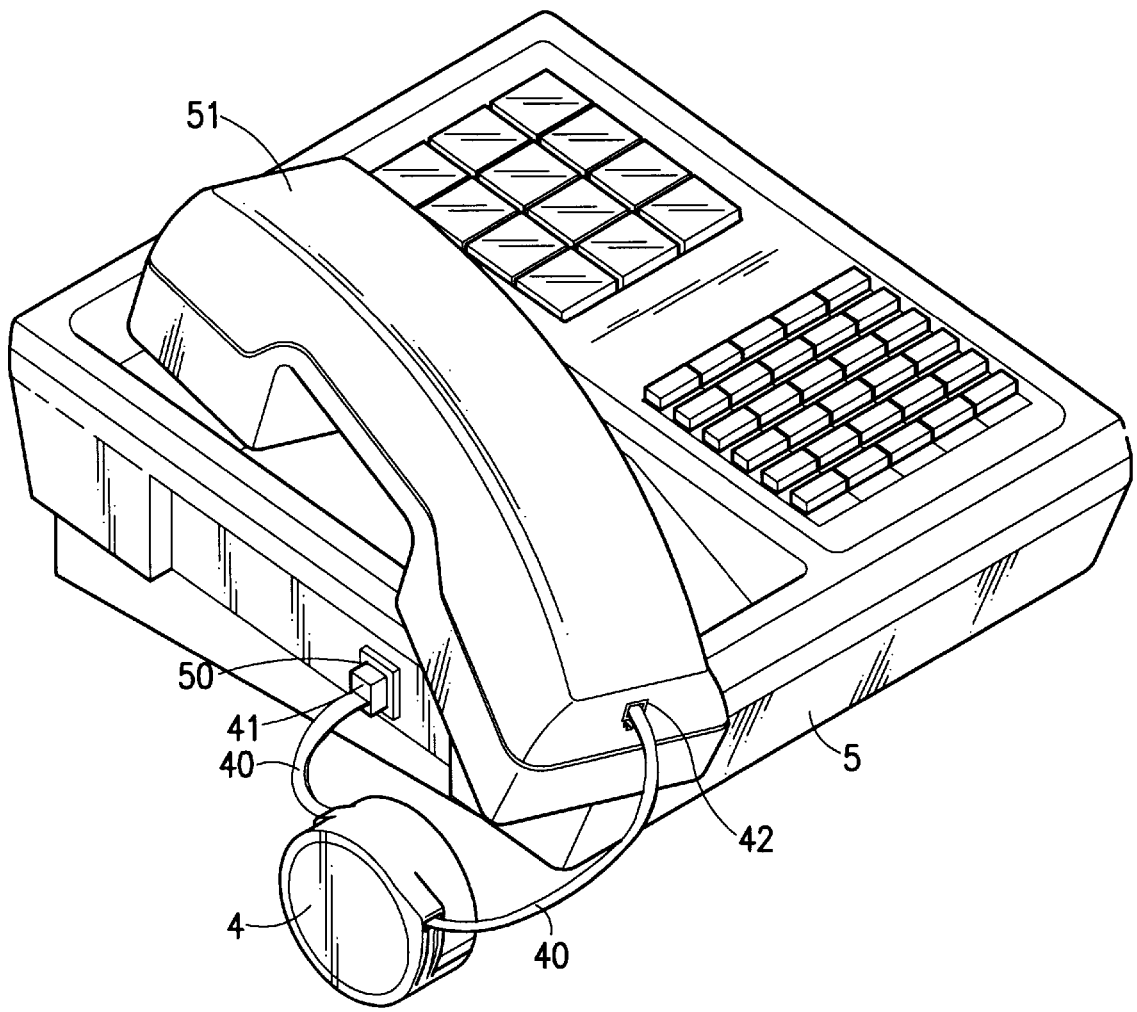
FIG. 7 is a perspective view showing a fault using of a conventional telephone cable-winding device.

The shape of the positioning body 13 is shown in FIGS. 1, 2 and 6. The positioning body 13 is an L shape metal clamping piece.

Although the invention has been described in detail with reference only to a preferred embodiment, those skilled in the art will appreciate that various modifications can be made without departing from the invention. Accordingly, the invention is defined only by the following claims which are intended to embrace all equivalent thereof.

| Description of the Numerals in Figures | | | |
|---|---|---|---|
| 1 | cable-winding device | 11 | cable |
| 10 | primary plug | 13 | positioning body |
| 12 | secondary plug | 131 | stopper |
| 130 | clamping portion | 133 | buckling portion |
| 132 | buckling tip | 135 | engaging portion |
| 134 | buckling hole | | |
| 136 | tube | | |
| 2 | mainframe | | |
| 20 | receptacle | | |
| 3 | receiver | | |

What is claimed is:

1. A positioning structure of a telephone cable winding device comprising, a primary plug for insertion into a telephone; a secondary plug for insertion into a telephone receiver; a cable winding box and a telephone cable wound within said cable winding box for extension of at least one end of said telephone cable from a receiving opening of said cable winding box and subsequent rewinding, at least one of said primary plug and said secondary plug being assembled to said at least one end of said telephone cable; a positioning body installed on the telephone cable at a location spaced from said at least one end by a predetermined distance, said positioning body being formed with an L-shaped clamping piece having a clamping portion for encompassing a portion of said telephone cable and a protruding stopper, wherein said stopper is blocked by said receiving opening to maintain a predetermined portion of said telephone cable external to said cable winding box.

2. The positioning structure as recited in claim 1, wherein a single end of said telephone cable is extendable from said cable winding box, said primary plug being affixed to said cable winding box and said secondary plug being assembled to said single end of said telephone cable.

3. The positioning structure as recited in claim 1, wherein each of two opposing ends of said telephone cable is extendable from said cable winding box, said primary plug being affixed to one of said two ends of said telephone cable and said secondary plug is assembled to the other of said two ends of said telephone cable.

4. A positioning structure of a telephone cable winding device comprising, a primary plug for insertion into a telephone; a secondary plug for insertion into a telephone receiver; a cable winding box and a telephone cable wound within said cable winding box for extension of at least one end of said telephone cable from a receiving opening of said cable winding box and subsequent rewinding, at least one of said primary plug and said secondary plug being assembled to said at least one end of said telephone cable; a positioning body installed on the telephone cable at a location spaced from said at least one end by a predetermined distance, said positioning body being formed by a clamping block for encompassing and engaging a portion of said telephone cable, said clamping block having a plurality of buckling tips and a buckling pillar formed on a first inner side thereof, a second inner side of said clamping block having a buckling hole formed therein for mating with said buckling pillar to maintaining said clamping block in engagement with said telephone cable, said clamping block being blocked by said receiving opening to maintain a predetermined portion of said telephone cable external to said cable winding box.

5. The positioning structure as recited in claim 4, wherein a single end of said telephone cable is extendable from said cable winding box, said primary plug being affixed to said cable winding box and said secondary plug being assembled to said single end of said telephone cable.

6. The positioning structure as recited in claim 4, wherein each of two opposing ends of said telephone cable is extendable from said cable winding box, said primary plug being affixed to one of said two ends of said telephone cable and said secondary plug is assembled to other of said two ends of said telephone cable.

* * * * *